(12) United States Patent
Fleizach et al.

(10) Patent No.: US 12,265,168 B2
(45) Date of Patent: Apr. 1, 2025

(54) RADIO FREQUENCY SIGNAL RECEIVER/IDENTIFIER LEVERAGING UNUSED PULSES

(71) Applicant: United States of America as represented by the Secretary of the Navy, San Diego, CA (US)

(72) Inventors: Gregory Knowles Fleizach, San Diego, CA (US); Mark William Owen, San Diego, CA (US); Christopher Craig Pelham, Chula Vista, CA (US); Michael Aaron Slutsky, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 486 days.

(21) Appl. No.: 17/866,601

(22) Filed: Jul. 18, 2022

(65) Prior Publication Data

US 2024/0019529 A1  Jan. 18, 2024

(51) Int. Cl.
*G01S 5/02* (2010.01)
*G01S 7/285* (2006.01)

(52) U.S. Cl.
CPC ........ *G01S 5/02524* (2020.05); *G01S 5/0257* (2013.01); *G01S 7/285* (2013.01)

(58) Field of Classification Search
CPC ........ G01S 13/931; G01S 13/58; G01S 7/412; G01S 7/411; G01S 7/292; G01S 7/415; G01S 7/285; G01S 7/354; G01S 7/487; G01S 13/10; G01S 7/4802; G01S 17/10; G01S 7/4815; G01S 1/0428; G01S 1/24; G01S 7/486; G01S 7/52026; G01S 7/527; G01S 7/352; G01S 5/02524; G01S 5/0257; G01S 5/0252; G01S 7/021; G01S 5/0294; H04B 1/7093; H04B 10/40; H04B 1/71637; H04B 1/709

See application file for complete search history.

(56) References Cited

U.S. PATENT DOCUMENTS

| 8,587,467 B1 * | 11/2013 | Zemany | ................. G01S 11/02 342/107 |
| 10,060,961 B1 | 8/2018 | Fleizach | |
| 2014/0052389 A1 * | 2/2014 | Welle | .................. G01S 7/2923 367/87 |

(Continued)

OTHER PUBLICATIONS

Hasani & Khosravi; Pulse deinterleaving based on fusing PDWs and PRI extraction process for radar-assisted edge devices considering computational costs; J Wireless Com Network (2021).

*Primary Examiner* — Olumide Ajibade Akonai
(74) *Attorney, Agent, or Firm* — Naval Information Warfare Center Pacific; Kyle Eppele; J. Eric Anderson

(57) ABSTRACT

An RF pulse correlator comprising a track database, an antenna, a receiver, and a processor. The track database is configured to store established tracks of RF emissions. The antenna and receiver are configured to receive RF pulses. The tracker is configured to generate improved geolocation data for every received RF pulse based on kinematics of the received RF pulses. The processor is communicatively coupled to the database, the receiver, and the tracker. The processor is configured to associate each received RF pulse with an existing track in the track database or to create a new track.

14 Claims, 6 Drawing Sheets

(56) References Cited

U.S. PATENT DOCUMENTS

| | | | |
|---|---|---|---|
| 2020/0072943 A1* | 3/2020 | Laur | G01S 13/931 |
| 2022/0123763 A1* | 4/2022 | Ray | H03H 17/0621 |
| 2022/0252715 A1* | 8/2022 | Dougherty | G01S 13/581 |
| 2022/0404458 A1* | 12/2022 | Ranney | H04K 3/45 |

* cited by examiner

RADIO FREQUENCY SIGNAL RECEIVER/IDENTIFIER LEVERAGING UNUSED PULSES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 112642.

BACKGROUND OF THE INVENTION

Radars are well known for determining the range of targets. During operation, radars send an electromagnetic pulse, which has a finite duration, represented as pulse width (PW), related to the required range resolution required. These pulses travel towards an object and are then reflected back. To obtain a correct range to the target, the target must be within the maximum unambiguous range of the radar for the bounced signal to be received before the next pulse is sent. More specifically, suppose a type of radar sends a pulse every T microseconds ($\mu s$). For the return signal to be received before the next pulse is sent, the round trip time must be less than T $\mu s$. Thus, the maximum unambiguous range, D, for the radar can be defined in terms of this time value, T and speed of light.

The time between the start of consecutive radar transmissions (electromagnetic pulses) is defined as the pulse repetition interval (PRI), also called the pulse period or ranging interval. When a radar emission is evaluated, estimation of the emission parameters and characterization when compared to other radars can be based on analysis of the radar PRI information from the received pulse emission. Thus, PRI can be a good starting point to characterize a radar based on the received emission. The PRI can vary from pulse-to-pulse and can change to many different values before the PRI sequence repeats. Additionally, the PRIs can change based on the emitter mode at which point the PRIs appear wholly unrelated to the previously observed PRIs. Other relevant emitter parameters are pulse RF, which is the rate at which the electromagnetic wave oscillates, and the emitter scan period, which is the time it takes the emitter to complete a scan (e.g. a full azimuth rotation for a maritime navigation radar).

Oftentimes it is desirable to identify individual radio frequency (RF) emitters based on the RF signals they emit. This concern exists particularly in maritime environments where smuggling and piracy are an issue for international security. Due to the congested RF space and the efforts of some to obfuscate the identity of their RF emitter, several solutions have been proposed to deinterleave the various RF signals. However, previous deinterleaving solutions fail to keep up with necessary data processing rates to deinterleave without dropping some of the received RF data. In many typical receivers that are not equipped to handle data spikes, RF pulses that cannot be associated into pulse groups and contact reports quickly enough do not get used in deinterleaving calculations. Therefore, there is a need for an improved correlator and deinterleaving method that can reduce the number of unused RF pulses.

SUMMARY

Disclosed herein is an RF pulse correlator comprising a track database, an antenna, a receiver, a tracker and a processor. The track database is configured to store established tracks of RF emissions. The antenna and receiver are configured to receive RF pulses. The tracker is configured to generate improved geolocation data for every received RF pulse based on kinematics of the received RF pulses. The processor is communicatively coupled to the database, the receiver, and the tracker. The processor is configured to associate each received RF pulse with an existing track in the track database or to create a new track.

Also disclosed herein is a method for deinterleaving RF pulses received by an antenna and a receiver comprising the following steps. A first step provides for time-sorting the received RF pulses based on a time of intercept (TOI) corresponding to each RF pulse. A second step provides for removing a given pulse as a candidate for associating with a given track in a track database if the given pulse's TOI falls outside a range of time values corresponding to the given track. A third step provides for removing the given pulse as a candidate for associating with the given track if the given pulse's PW falls outside a range of PW values corresponding to the given track. A fourth step provides for removing the given pulse as a candidate for associating with the given track if the given pulse's RF falls outside a frequency range corresponding to the given track. A fifth step provides for removing the given pulse as a candidate for associating with the given track if the given pulse's geolocation data, as determined by a kinematics model, fall outside a range of geolocation values corresponding to the given track. A sixth step provides for performing the following sub-steps if the given pulse has not been removed as a candidate for association in steps (2)-(5). The first sub-step provides for leveraging a Kalman filter to calculate a most likely position of the given track as if the given pulse were associated with the given track. The next sub-step provides for calculating a PW score, an RF score, and a geolocation/kinematics score for the given pulse with respect to the given track at its most likely position. Another sub-step provides for calculating a total score for the given pulse with respect to the given track. Another sub-step provides for identifying the given track as a candidate track if the total score for the given pulse with respect to the given track is above a score threshold. A seventh step provides for repeating steps (2) through (6) for the given pulse and every track in the track database. An eighth step provides for creating a new active track based on the given pulse if the total score for the given pulse with respect to every track in the track database is below the score threshold. A ninth step provides for associating the given pulse with a candidate track with a highest-score track.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and apparatuses below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
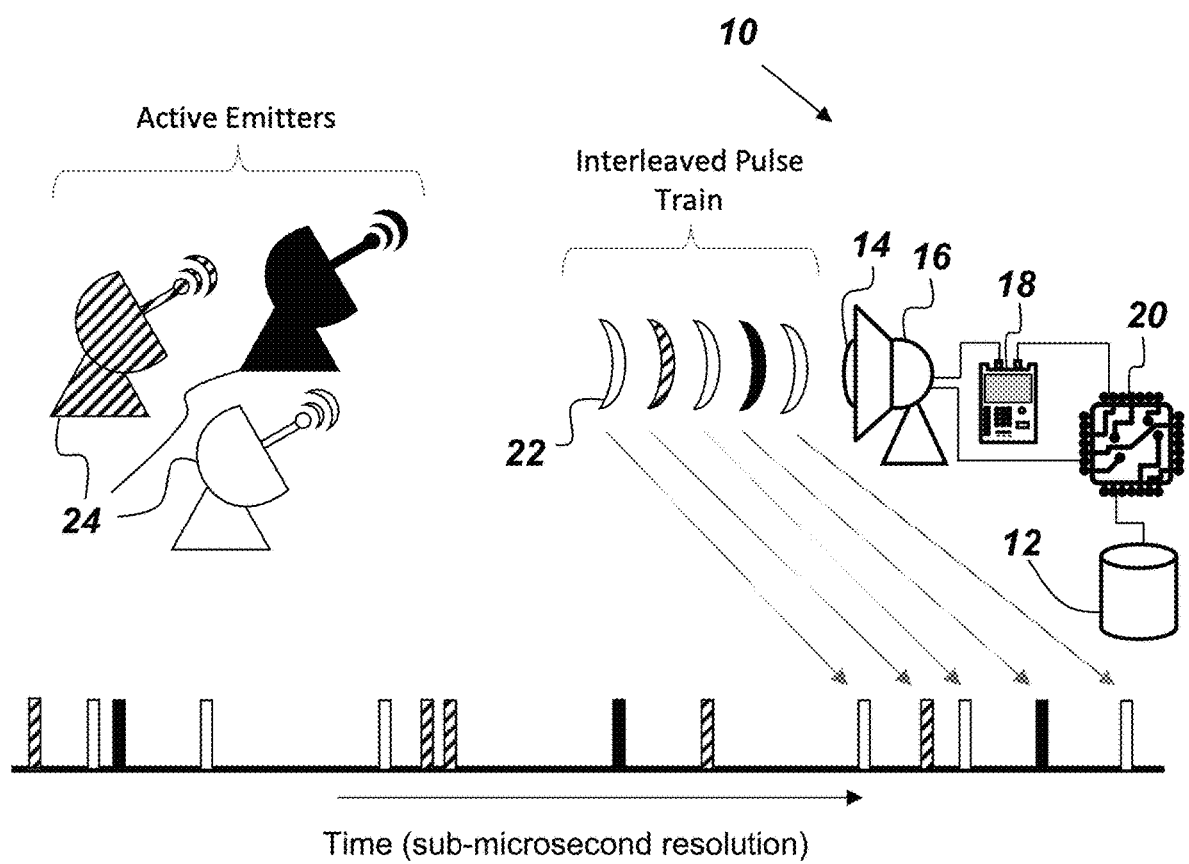
FIG. 1 is an illustration/schematic of an embodiment of an RF pulse correlator.

FIG. 1 is an illustration of an RF pulse correlator 10 that comprises, consists of, or consists essentially of a track database 12, an antenna 14, a receiver 16, a tracker 18, and a processor 20. The track database 12 is configured to store established tracks of RF emissions. The antenna 14 and receiver 16 are configured to respectively receive and initially process RF pulses 22 emitted from RF emitters 24. The tracker 18 is configured to generate improved geolocation data for every received RF pulse 22 based on kinematics of the received RF pulses 22. The RF pulse correlator 10 uses the tracker 18 to incorporate kinematics in the pulse association process such that pulses may be grouped into contact reports (CRs). The processor 20 is communicatively coupled to the database 12, the receiver 16, and the tracker 18. The processor 20 is configured to associate each received RF pulse 22 with an existing track in the track database 12 or to create a new track.

In FIG. 1, the sample pulse train of RF pulses 22 comprises RF emissions from three different, remotely-sensed emitters 24. In this example, the solid black pulses 22 are emitted by a stable PRI emitter with constant time spacing between pulses. The pulses with no fill/color and the pulses with cross-hatching are emitted by two different jittered/agile emitters 24, which have inconsistent time spacing. The RF pulse correlator is configured to deinterleave the pulses (i.e., bin the different pulses into groupings corresponding to their respective emitters) without a priori knowledge of emitter behavior or the number of emitters in a particular scene of observation. When pulses can be associated together PRI and even scan period measurements can be made and CRs can be generated. The CR format may describe the emitter parameters (PW, RF, PRI, scan period, TOI, and geolocation) and associates emitters spatially and across time.

Figure 2:
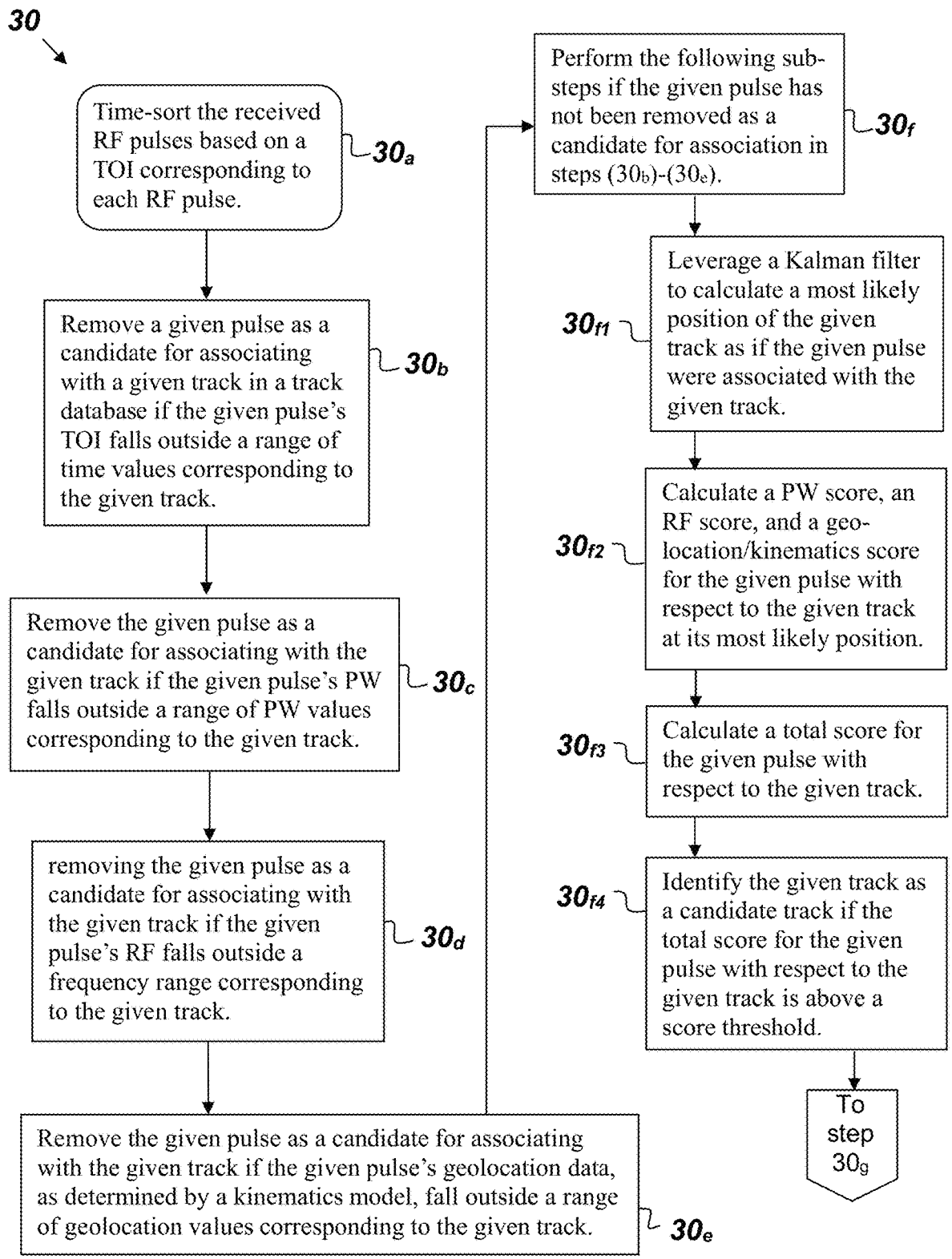
FIGS. 2 and 3 are a flowchart of a method for deinterleaving RF pulses.
Figure 3:
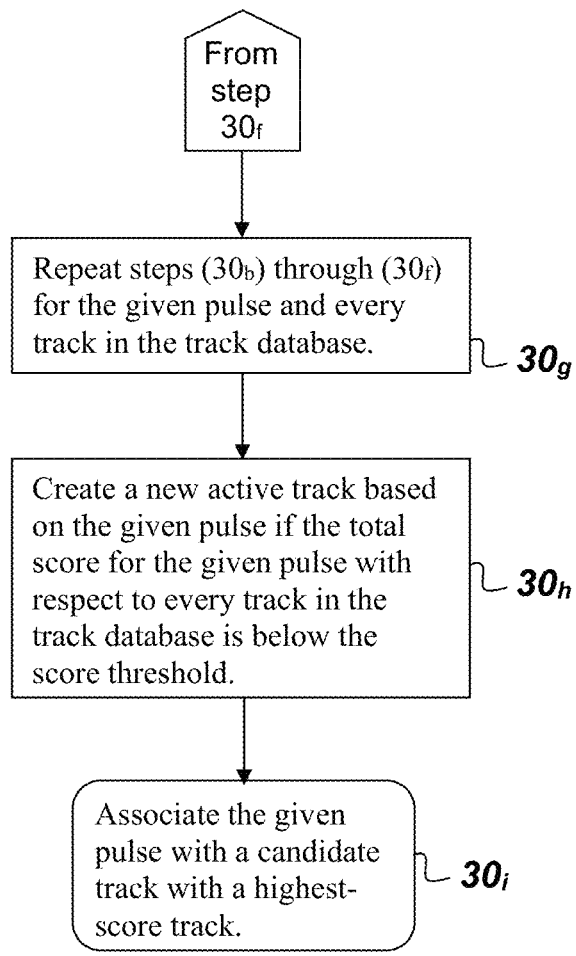

FIGS. 2 and 3 are a flowchart of an example embodiment of a method 30 for using the RF pulse correlator 10 to deinterleave RF pulses received by an antenna and a receiver comprising the following steps. A first step $30_a$ provides for time-sorting the received RF pulses based on a TOI corresponding to each RF pulse. A second step $30_b$ provides for removing a given pulse as a candidate for associating with a given track in a track database if the given pulse's TOI falls outside a range of time values corresponding to the given track. A third step $30_c$ provides for removing the given pulse as a candidate for associating with the given track if the given pulse's PW falls outside a range of PW values corresponding to the given track. A fourth step $30_d$ provides for removing the given pulse as a candidate for associating with the given track if the given pulse's RF falls outside a frequency range corresponding to the given track. A fifth step $30_e$ provides for removing the given pulse as a candidate for associating with the given track if the given pulse's geolocation data, as determined by a kinematics model, fall outside a range of geolocation values corresponding to the given track. A sixth step $30_f$ provides for performing the following sub-steps if the given pulse has not been removed as a candidate for association in steps (2)-(5). The first sub-step $30_{f1}$ provides for leveraging a Kalman filter to calculate a most likely position of the given track as if the given pulse were associated with the given track. The next sub-step $30_{f2}$ provides for calculating a PW score, an RF score, and a geolocation/kinematics score for the given pulse with respect to the given track at its most likely position. Another sub-step $30_{f3}$ provides for calculating a total score for the given pulse with respect to the given track. Another sub-step $30_{f4}$ provides for identifying the given track as a candidate track if the total score for the given pulse with respect to the given track is above a score threshold. A seventh step $30_g$ provides for repeating steps (2) through (6) for the given pulse and every track in the track database. An eighth step $30_h$ provides for creating a new active track based on the given pulse if the total score for the given pulse with respect to every track in the track database is below the score threshold. A ninth step $30_i$ provides for associating the given pulse with a candidate track with a highest-score track.

Figure 4:
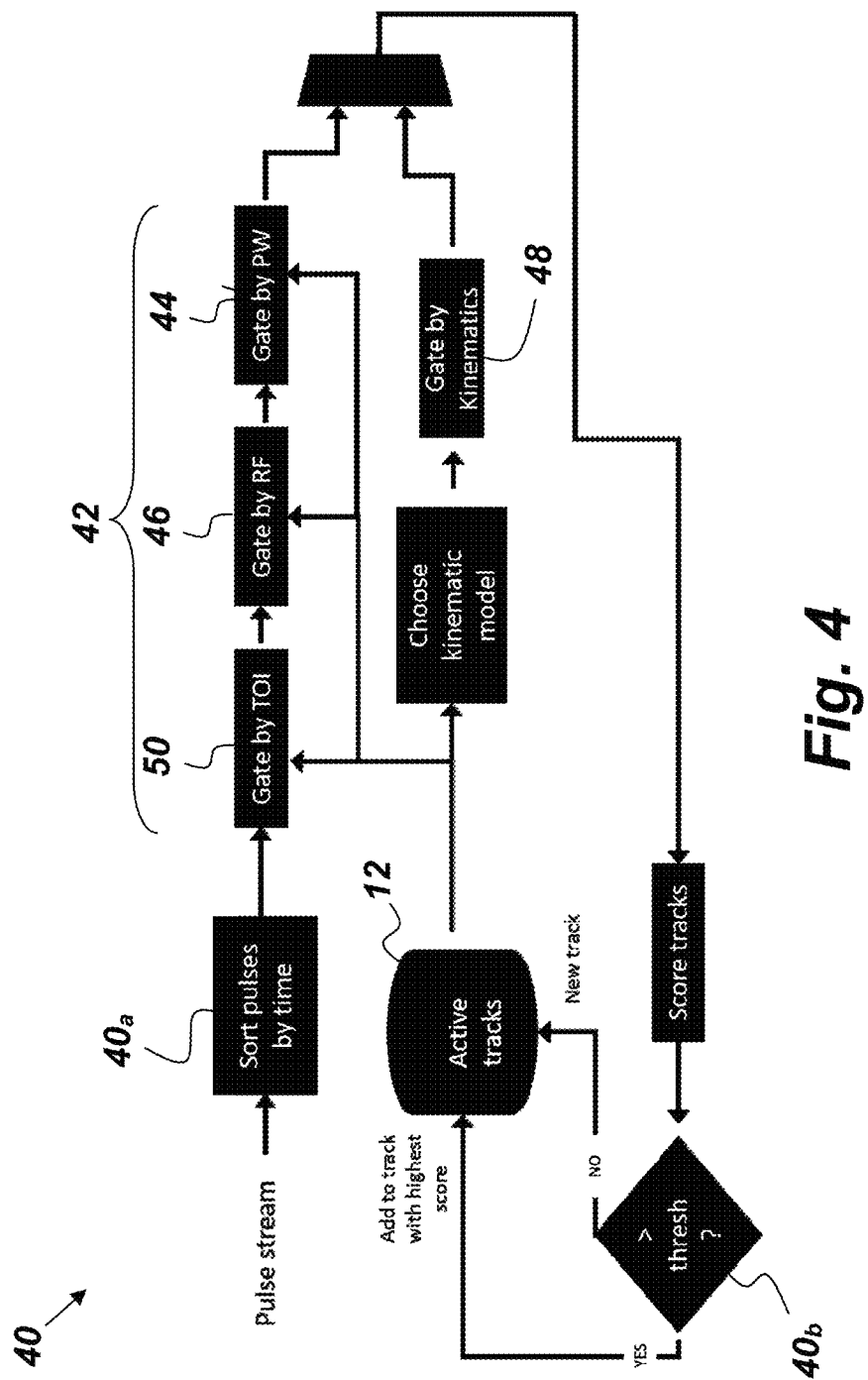
FIG. 4 is a block diagram of an example embodiment of a method for using an RF pulse correlator to deinterleave RF pulses.

FIG. 4 is a block diagram of an example embodiment of a method 40 for using the RF pulse correlator 10 to deinterleave RF pulses. The first step $40_a$ in the process is to sort the pulses by time. If the input data is a stream of individual pulses then it may be desirable to buffer the data to make sure the pulses are roughly time sorted. Correlating out-of-order data is a difficult problem in the tracking community. Alternative approaches can be used to address the out-of-order data problem, such as a Multi-Hypothesis Tracker (MHT), which holds on to predictions for an undetermined period of time before solidifying a hypothesis. However, MHTs are known to be bottlenecks in data processing pipelines which could cause unwelcome slowdowns. The solution to buffer and sort input data is an effective compromise between processing efficiency and low software complexity. The ability to ensure the pulses are time-sorted on the front end drastically improves the results compared to leaving them unsorted.

Still referring to FIG. 4, the RF pulse correlator 10 maintains in the track database 12 a list of active tracks from data that was interleaved without data drops, but upon start up, there will be no existent tracks. The first pulse processed by the RF pulse correlator 10 becomes the first point of the first track. The processor 20 then sends each subsequent pulse through an association pipeline 42, which performs comparison operations known as gating. Gating is a term used to describe the process where incoming data is determined to be so far outside a reasonable range of a given track, such that it is not statistically meaningful for association. The pulses can be gated by a PW gate 44, an RF gate 46, a geolocation (i.e. kinematics) gate 48, and a TOI gate 50. The TOI gating in FIG. 4 is the check to see whether it makes sense to associate the current pulse with the active tracks (i.e. the active pulse groups) currently stored in the track database 12 based on when the pulse was collected. For example, the RF pulse correlator 10 will allow the pulse to potentially be associated with an active pulse group (also referred to as a track) based on the time difference between the latest pulse in the pulse group and the current pulse. If that pulse is beyond a pre-defined threshold, then the pulse will be "gated out." If the pulse TOI is within expected time difference, it is a candidate to be associated with that pulse group. The gating by PW and RF is rather straightforward and involves comparing these parameters from the pulse to those in the active tracks. If the parameters are within a pre-defined threshold, then the parameters pass the gate. Otherwise, the pulse will be "gated out" and not be a candidate for association with an existing track in the track database 12. A suitable technique to acquire RF pulse geolocation data includes, but is not limited to, a method known as "Azimuth, Elevation," which allows the processor 20 to obtain geolocation data with a single receiver, which is typically deployed on an aircraft.

Figure 5:
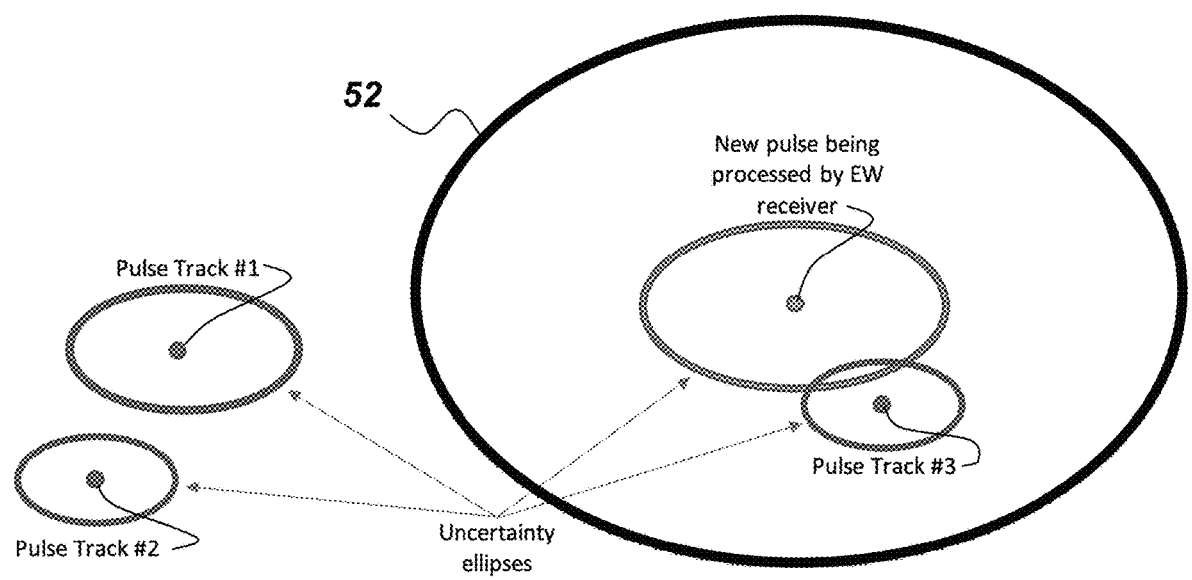
FIG. 5 is an illustration of a visual depiction of kinematics gating.

FIG. 5 is an illustration of a kinematics gating, such as may be performed by the "Gate by Kinematics" block 48 shown in FIG. 4, based on pulse geolocation and Target Location Error (TLE). In the "Azimuth, Elevation" method, geolocation data is provided via a trigonometric calculation based on known altitude of the aircraft and angle of bearing of the measured pulse. The result is a latitude and longitude accompanied by TLE expressed as an area of uncertainty ellipse. Once the pulse geolocation and TLE is calculated by the "Azimuth, Elevation" method, the processor 20 may perform the gating process. The incoming pulse may compared against all existing tracks in the track database 14. In this example, kinematics gating is used to remove statistical low scoring hypothesis tests by eliminating Pulse Track #1 and Pulse Track #2 from the remaining track scoring pipeline. Both Pulse Track #1 and Pulse Track #2 in this example fall outside of the uncertainty ellipse 52, which represents the maximum statistical range that the incoming pulse can be associated with an existing track, leaving the processor 20 with only Pulse Track #3 as a potential match for association. However, the processing pipeline is not done yet because it is possible that the new incoming pulse should generate a new Pulse Track rather than associate with Pulse Track #3.

After the processor 20 has sent each pulse through the gating process, the RF pulse correlator 10 chooses an appropriate kinematic model for the relevant origin of the RF pulse at issue. The kinematic model may be defined by the existing track to which it is being compared. Many different kinematics models may be used by the RF pulse correlator 10. A suitable example of a kinematic model that may be used for kinematics gating includes, but is not limited to, an Interactive Multiple Model (IMM) algorithm. Next, the RF pulse correlator 10 may leverage a Kalman filter to calculate the most likely position of each feasible track as if the incoming pulse were associated with the respective tracks. A score may be calculated with unique weight factors for the kinematics, RF, and PW. The weighting factors may be adjusted based on observed data or learned via machine learning. More specifically, the importance of the kinematics, RF, and PW may be adjusted by changing the weight factors depending on the specific scenario in which the RF pulse correlator 10 is being used. Therefore, the weights should be unique to each implementation of the RF pulse correlator 10 and method 30. The resulting equation (labeled as Equation 1 below) for the total score for a given pulse with respect to a given track may be written as follows:

Total_Score=(Kinematic Weight*Kinematic_Score)+
(RF Weight*RF_Score)+
(PW_Weight*PW_Score)   (Eq. 1)

The final step 40$_b$ of the method 40 shown in FIG. 4 is to determine whether a new track should be instantiated based on the score calculations. If the total score is below a given threshold, then a new grouping of pulses is created (i.e. a new active track) and added to the track database 12. If any of the scores for a given pulse with respect to a given existing track in the track database 12 are above the threshold, the given pulse will be associated with the track associated with the highest score. In this way, the equation for calculating the track score includes location data.

The effectiveness of method 30 may be verified by at least the following two methods. First, various track metrics can be calculated for broad scale analysis to determine if the RF pulse correlator 10 is grouping pulses together effectively. For example, measuring the number of single-point tracks generated by a known pulse dataset after tuning the weighting factors would provide an indication of success. Generally, fewer single-point tracks implies that the RF pulse correlator 10 is performing better but this can vary depending on the data source. Other indicators include:

Total number of tracks in the track database
Total number of tentative tracks versus established tracks
Average track quality/fidelity
Average track hold time A second verification method requires a ground truth labeled dataset. A human can manually group pulses together into pulse groups based on known EW analyst heuristics or a data collection with cooperative targets can be organized. This ground truth dataset can be fed into the RF pulse correlator 10 to check the accuracy of pulse association and calculate the rate of mis-association. In an ideal scenario, a machine learning algorithm may use a large enough dataset to calculate optimal weighting factors. In addition, the method 30 may leverage knowledge of bandwidth ranges specified by the Federal Communication Commission (FCC). For example, a Wi-Fi router will behave differently from airplane radar system in a predictable manner. This knowledge influences how the pulses are grouped by the RF pulse correlator 10.

Figure 6:
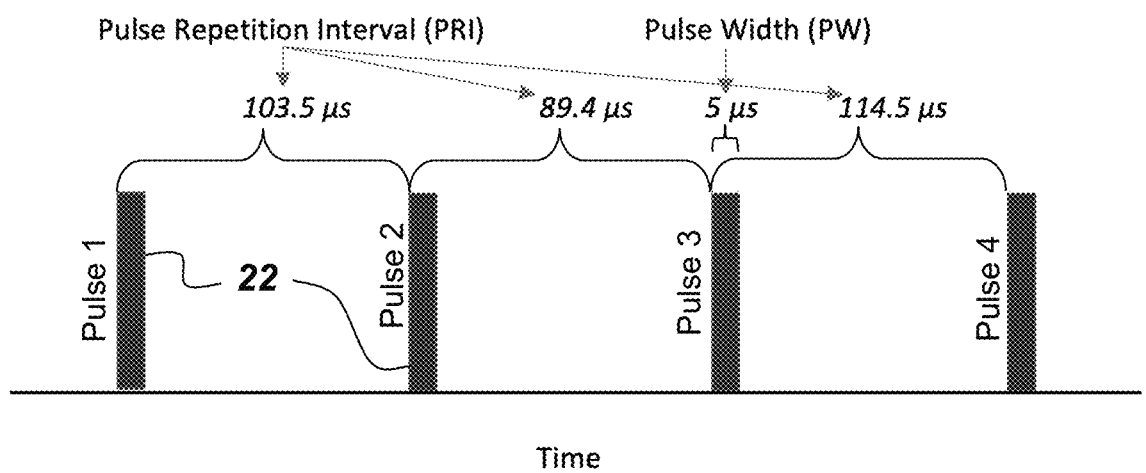
FIG. 6 is a depiction of adjacent RF pulses along a timeline.

FIG. 6 is a depiction of adjacent RF pulses 22 along a timeline. Once the received RF pulses 22 are associated together, the PRI can be calculated by taking the difference between adjacent pulse TOIs, an example of which is shown in FIG. 6. In this example, there are four pulses 22 associated together by the RF pulse correlator 10 and the emitter is presumed to be a single non-varying PRI emitter, with ground truth of 100 µs between pulses. In reality, the RF pulse correlator 10 may have erroneous data. For example, pulses 1, 2, 3, and 4 may contain the follow respective TOIs: 1001.8 µs, 1105.3 µs, 1194.7 µs, and 1309.2 µs (these values are notional and not representative of actual data collected). In this example, the pulse grouping would reveal three PRI values: 103.5 µs, 89.4 µs, 114.5 µs. The result is an average of 102.5 µs for a single PRI emitter. Similarly, if this were a stagger PRI emitter the legs for the CR would be 103.5 µs, 89.4 µs, and 114.5 µs. In addition to calculating the PRI, the RF pulse correlator may be configured to generate scan period estimates as well by clustering the TOI differences.

After the pulses have been fully processed by the association pipeline categorical labels, known as Emitter Groupings, may be created for the pulse groups and CRs may be produced. For example, a classification function may be used by the processor 20 that assigns an Emitter Grouping, which categorizes emitters with labels, to each pulse group by comparing the pulse group in question against a historical emitter database. The fundamental emitter clock and mode may be determined based on the previously described PRI calculation by measuring minuscule changes and patterns which develop over time. The emitter database (i.e., the track database 12) tracks these values over days and weeks. The processor 20 may also be configured to provide confirmation that the recommended Emitter Grouping label is correct. This may be accomplished by stringing together tracks of formed pulse groups, or CRs. These CRs may be aggregated together to build a more complete map of an emitter known as a model. After the model is generated, it may be compared to other models in the track database 12 to verify the validity of the generated CR and improve the certainty of the clock and mode calculations.

The RF pulse correlator 10 allows for pulses which previous methods would have been unable to associate together to be grouped together into a CR, which contains PW, RF, and PRI parameters as well as the Emitter Grouping without using template matching. These CRs can then be used to track the corresponding emitter over time. By associating CRs together, it is possible to estimate the scan period parameter of the corresponding emitter as well. In this manner the pulses that were once unused because they could not be associated together can be synthesized into a common CR format that can be used for emitter tracking or further emitter characterization. If desired, the RF pulse correlator 10 may be used to process incoming RF pulses in real time or in an "off-line" scenario where the data does not have to be real-time. If latency is a primary concern in a given use case, it may not be possible to buffer the input pulses to make sure they are time sorted. The track database 12 may be any data storage device, including, but not limited to, system memory (aka RAM).

From the above description of the RF pulse correlator 10, it is manifest that various techniques may be used for implementing the concepts of the RF pulse correlator 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the RF pulse correlator 10 is not limited to the particular embodiments described herein, but is capable of many embodiments without departing from the scope of the claims.

We claim:

1. A radio frequency (RF) pulse correlator comprising:
   a track database configured to store established tracks of RF emissions;
   an antenna and a receiver configured to receive RF pulses;
   a tracker configured to generate improved geolocation data for every received RF pulse based on kinematics of the received RF pulses, wherein the improved geolocation data includes a latitude and longitude of a point of origin for each received RF pulse;
   a processor communicatively coupled to the database, the receiver, and the tracker, wherein the processor is configured to associate each received RF pulse with an existing track in the track database or to create a new track; and
   wherein the processor is configured to perform the following steps:
   a) time-sorting the received RF pulses based on a time of intercept (TOI) corresponding to each RF pulse;
   b) removing a given pulse as a candidate for associating with a given track in the track database if the given pulse's TOI falls outside a range of time values corresponding to the given track;
   c) removing the given pulse as a candidate for associating with the given track if the given pulse's pulse width (PW) falls outside a range of PW values corresponding to the given track;
   d) removing the given pulse as a candidate for associating with the given track if the given pulse's RF falls outside a frequency range corresponding to the given track;
   e) removing the given pulse as a candidate for associating with the given track if the given pulse's improved geolocation data fall outside a range of geolocation values corresponding to the given track;
   f) if the given pulse has not been removed as a candidate for association in steps (b)-(e):
      i) leveraging a Kalman filter to calculate a most likely position of the given track as if the given pulse were associated with the given track,
      ii) calculating a PW score, an RF score, and a geolocation/kinematics score for the given pulse with respect to the given track at its most likely position,
      iii) calculating a total score for the given pulse with respect to the given track equal to (a kinematic weight times the kinematic score)+ (an RF weight times the RF score)+ (a PW weight times the PW score),
      iv) identifying the given track as a candidate track if the total score for the given pulse with respect to the given track is above a score threshold;
   g.) repeating steps (b) through (f) for the given pulse and every track in the track database;
   h.) creating a new active track based on the given pulse if the total score for the given pulse with respect to every track in the track database is below the score threshold; and
   i.) associating the given pulse with a candidate track with respect to which the given pulse has a highest total score.

2. A method for deinterleaving radio frequency (RF) pulses received by an antenna and a receiver comprising:
   a) time-sorting the received RF pulses, with a processor, based on a time of intercept (TOI) corresponding to each RF pulse;
   b) removing a given pulse as a candidate for associating with a given track in a track database if the given pulse's TOI falls outside a range of time values corresponding to the given track;
   c) removing the given pulse as a candidate for associating with the given track if the given pulse's pulse width (PW) falls outside a range of PW values corresponding to the given track;
   d) removing the given pulse as a candidate for associating with the given track if the given pulse's RF falls outside a frequency range corresponding to the given track;
   e) removing the given pulse as a candidate for associating with the given track if the given pulse's geolocation data, as determined by a kinematics model, fall outside a range of geolocation values corresponding to the given track;
   f) if the given pulse has not been removed as a candidate for association in steps (b)-(e):
      i) leveraging a Kalman filter to calculate a most likely position of the given track as if the given pulse were associated with the given track,
      ii) calculating a PW score, an RF score, and a geolocation/kinematics score for the given pulse with respect to the given track at its most likely position,
      iii) calculating a total score for the given pulse with respect to the given track equal to (a kinematic weight times the kinematic score)+ (an RF weight times the RF score)+ (a PW weight times the PW score),
      iv) identifying the given track as a candidate track if the total score for the given pulse with respect to the given track is above a score threshold;

g.) repeating steps (b) through (f) for the given pulse and every track in the track database;

h.) creating a new active track based on the given pulse if the total score for the given pulse with respect to every track in the track database is below the score threshold; and i.) associating the given pulse with a candidate track with respect to which the given pulse had the highest total score (referred to as a highest-score track).

3. The method of claim 2, further comprising storing the new active track in the track database.

4. The method of claim 3, wherein the time-sorting step further comprises buffering the received RF pulses if the received RF pulses represent a stream of individual pulses such that each RF pulse is processed sequentially in the order in the RF pulses are received by the antenna and the receiver.

5. The method of claim 4, wherein a first received RF pulse processed by the processor becomes a first point of a first track.

6. The method of claim 5, wherein the kinematics model is a constant position model based on an Interactive Multiple Model (IMM) algorithm.

7. The method of claim 6, wherein the geolocation data for the given pulse further includes a Target Location Error (TLE) expressed as an area of uncertainty ellipse to accompany the latitude and longitude of the point of origin.

8. The method of claim 7, further comprising calculating track metrics for the existing tracks in the track database and performing broad scale analysis to verify that received RF pulses are being accurately associated with the tracks in the track database.

9. The method of claim 7, further comprising:
providing a ground truth dataset containing known pulses from known tracks;
processing the known pulses according to the method of claim 4; and
checking an accuracy of pulse association by calculating a rate of mis-association by comparing groupings resulting from the processing of the known pulses according to the method of claim 2 with the ground truth dataset.

10. The method of claim 7, further comprising:
calculating the pulse repetition interval (PRI) of the highest-score track based on pulses associated with the highest-score track in the track database.

11. The method of claim 10, further comprising:
generating a scan period estimate for the highest-score track by clustering TOI differences.

12. The method of claim 10, further comprising:
using a validator to assign an emitter grouping to the highest-score track by comparing the highest-score track against emitters in an emitter database, wherein the emitter database includes fundamental emitter clock and mode information for each emitter in the emitter database;

wherein the fundamental emitter clock and mode information for each identified emitter is determined based on emitter PRI calculations, by measuring minuscule changes and patterns which develop over time.

13. The method of claim 12, wherein the fundamental emitter clock and mode information for each emitter in the emitter database is updated over time to reflect changes and patterns in emitter PRI.

14. The method of claim 2, further comprising removing the given pulse as a candidate for associating with the given track if the given pulse's bandwidth falls outside a bandwidth range specified by the Federal Communication Commission (FCC) that corresponds to the given track.

\* \* \* \* \*